March 19, 1968   M. DUBESSET   3,373,880
AUTOMATIC TRANSFER MECHANISM FOR BOTTLES
Filed June 27, 1966   5 Sheets-Sheet 3
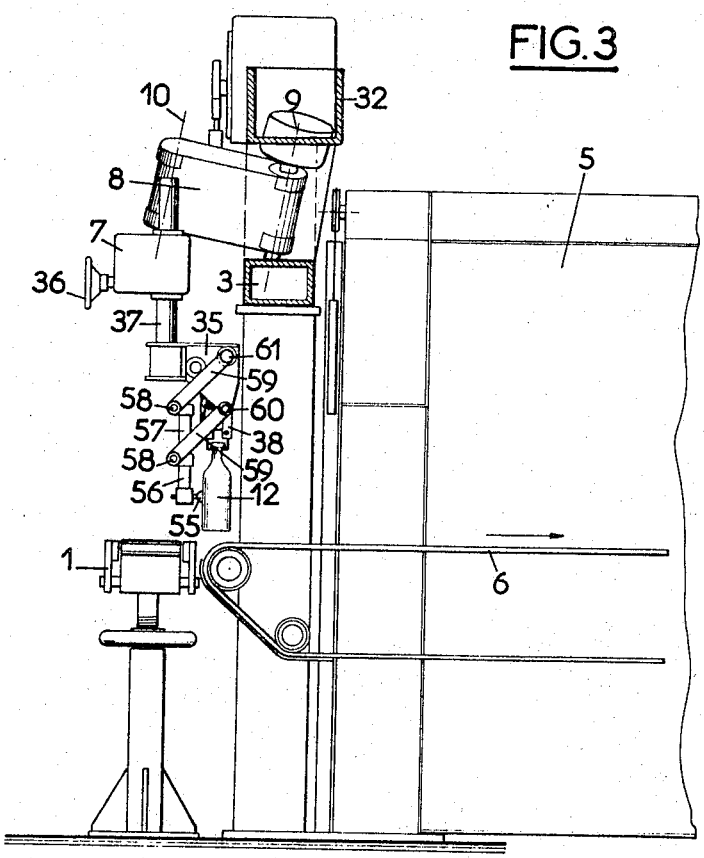
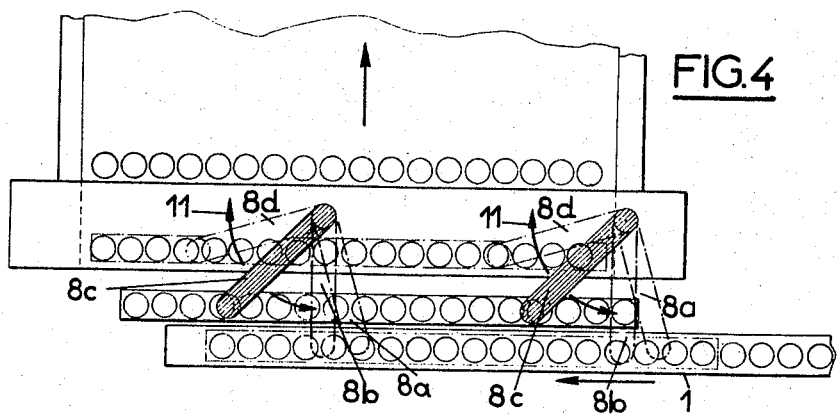
Inventor
MICHEL DUBESSET
Attorneys

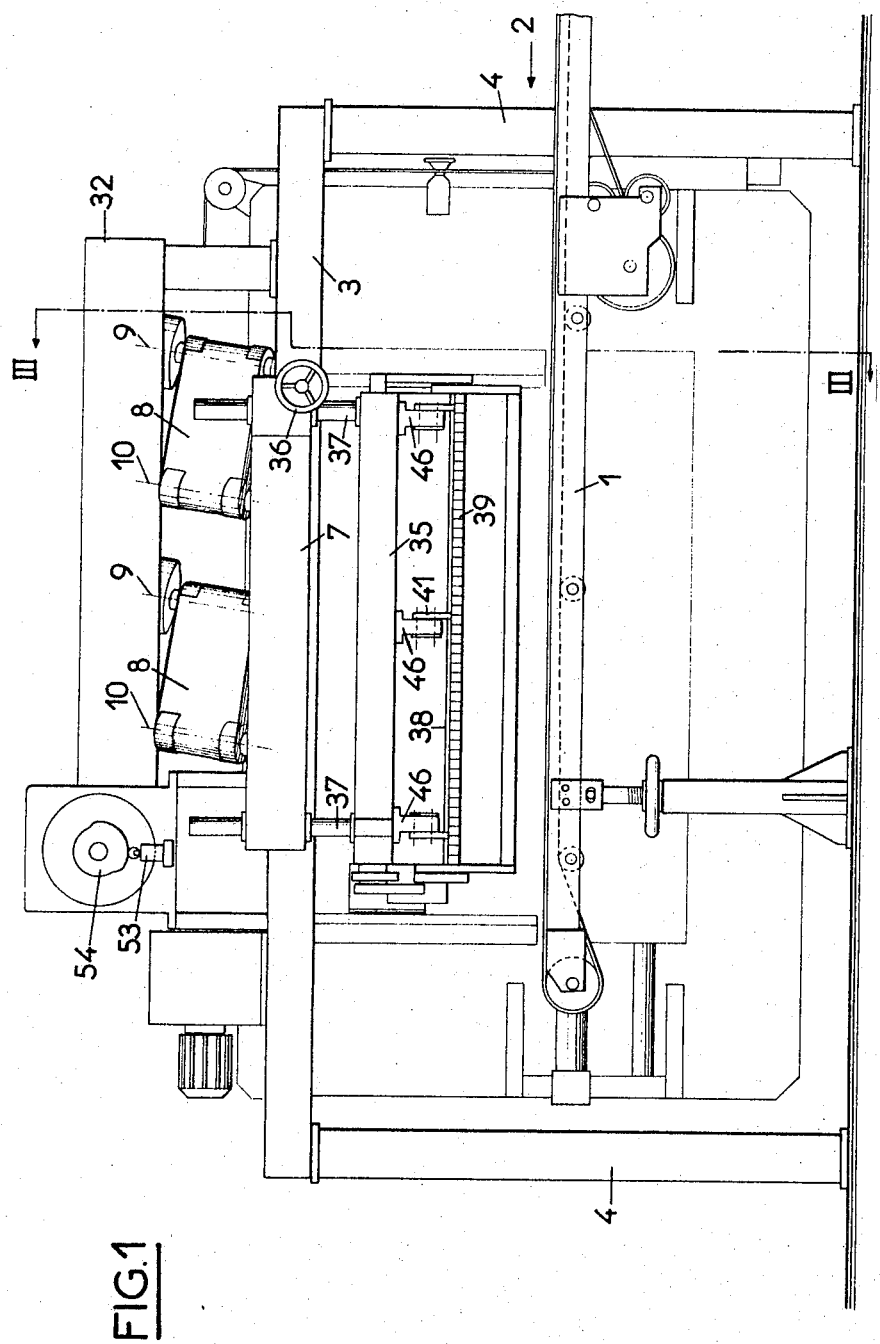

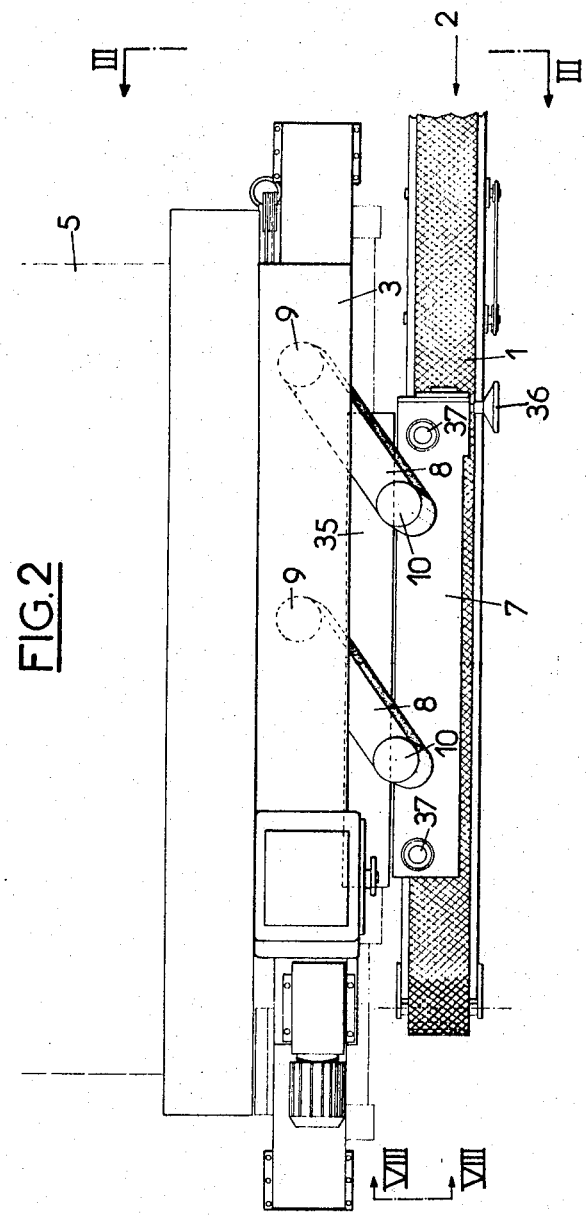

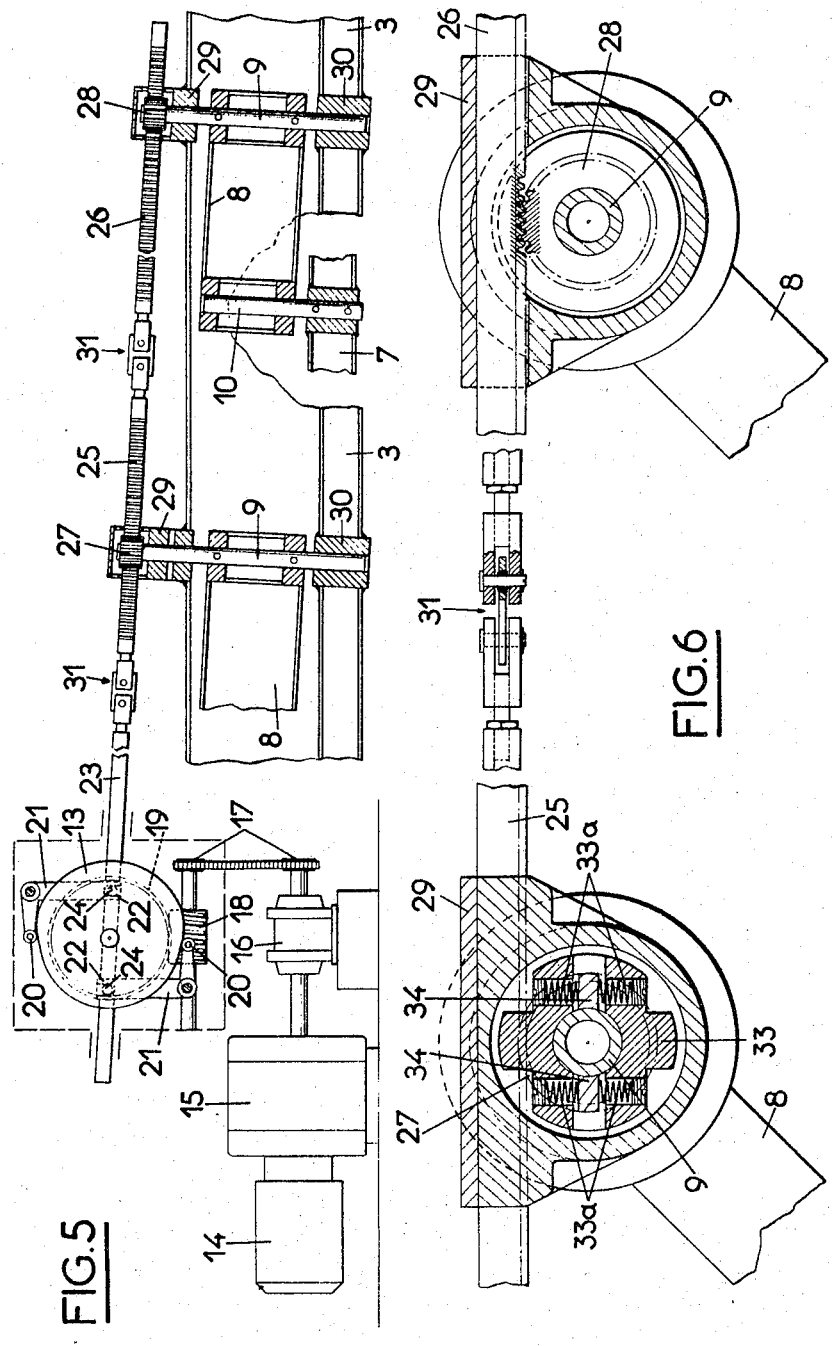

March 19, 1968     M. DUBESSET     3,373,880

AUTOMATIC TRANSFER MECHANISM FOR BOTTLES

Filed June 27, 1966     5 Sheets-Sheet 5

Inventor

MICHEL DUBESSET

By Holcombe, Wasserall & Bricebois
Attorneys

3,373,880
Patented Mar. 19, 1968

3,373,880
AUTOMATIC TRANSFER MECHANISM FOR BOTTLES
Michel Dubesset, Compiegne, France, assignor to Societe Anonyme dite: Ateliers de Construction de Compiegne, Compiegne, Oise, France
Filed June 27, 1966, Ser. No. 560,592
Claims priority, application France, July 15, 1965, 24,758, Patent 1,450,805
6 Claims. (Cl. 214—1)

This invention relates to the manipulation of glass bottles, and particularly to the type of manipulation which consists in picking up the bottles, which have just been manufactured and are delivered in a single row by a conveyor, in order to reposition them in a number of rows, usually from five to eight, on a second conveyor which will carry them through an annealing lehr to the final manufacturing stage.

The object of the invention is to provide a completely automatic machine which makes it possible to grip as they arrive on the incoming conveyor a complete row of bottles corresponding to the width of the lehr without having to stop the conveyor, and to then lift, laterally displace and reposition them, in a predetermined order on the conveyor supplying the annealing lehr.

The invention consists in providing, in order to carry out these movements, a mobile device comprising means capable of gripping by their necks an entire row of bottles, said device being moved in an inclined circular path by means of a parallelogram linkage system pivotally mounted on two oblique axes in such a manner that a movement accompanying the bottles along the conveyor is followed by a lifting movement and finally by the dropping of the bottles on the conveyor of the lehr, and by a return to the initial position. The complete cycle is controlled in synchronism with the control means of the manufacturing machine, so that a new cycle starts after a predetermined number of pulses.

Figure 7:
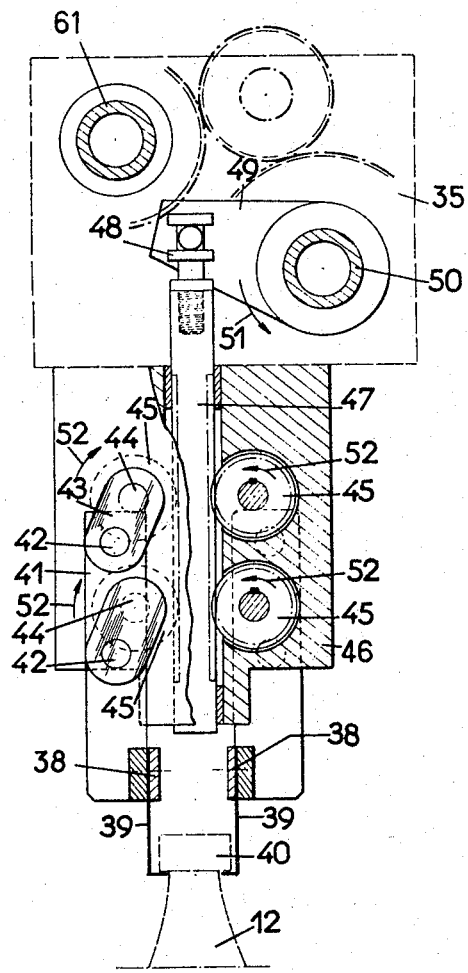
Figure 8:
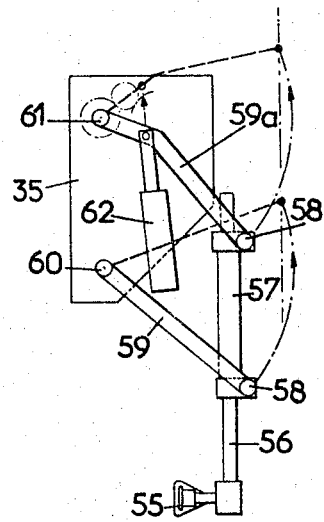

The invention also relates to other improvements which will become apparent from a reading of the following description of one embodiment of the invention given purely by way of example and illustrated in the accompanying drawings, in which:

FIG. 1 is an elevational view of the machine positioned at the entrance of an annealing lehr;
FIG. 2 is a top plan view of the machine;
FIG. 3 is a vertical section taken along the line III—III of FIG. 2;
FIG. 4 schematically illustrates the operation of the machine as seen from above;
FIG. 5 is a partial sectional view taken through the control mechanism for the oscillating arms;
FIG. 6 is a sectional detail view on a larger scale showing the mechanism for driving the oscillating arms, taken in a plane perpendicular to their pivotal axes;
FIG. 7 is an elevational view, partially in section, showing the device for picking up the bottles; and
FIG. 8 schematically illustrates the mechanism for controlling the alignment bar, seen in the direction VIII—VIII of FIG. 2.

FIGURES 1-4 show the conveyor belt 1 on which the bottles arrive, moving in the direction indicated, by the arrow 2 from a manufacturing machine (not shown) which produces the bottles at a predetermined rate. The machine comprises a crossbar 3 supported by columns 4 and positioned over the entrance to an annealing lehr 5, within which is a conveyor 6 occupying substantially the full width of the lehr and travelling in a path perpendicular to that of the conveyor 1.

A movable link 7 is mounted parallel to the fixed bar 3 to which it is connected by two arms 8 which are pivotally connected to the fixed bar 3 and the movable link 7 by two pins 9 and 10 which are parallel to each other but inclined with respect to the vertical as well as both transversely (see FIG. 1) and longitudinally (see FIG. 3) with respect to the machine.

It follows that the movable link 7 can be so moved that each point thereon describes a circular arc, said arc having a radius equal to the distance between the pins 9 and 10, all said arcs being located in planes perpendicularly inclined with respect to the pins 9 and 10. During this movement the movable link 7 remains constantly parallel to the horizontal and parallel to the fixed bar 3.

FIGURE 4 shows that the arms 8 move from a position 8a, shown in broken lines, to a position 8d, by passing through two intermediate positions 8b and 8c. When the arms are at 8a they are swung in the direction of the arrows 11 thus imparting to the movable link 7, as it moves from 8a to 8b, the speed at which the bottles are delivered by the conveyor 1. This link moves substantially parallel to the direction in which the bottles move for a relatively short time, during which the bottles are gripped by a mechanism which will be hereinafter described, so that the conveyor need not be stopped and no relative movement between the bottles and the gripping means is required, except for a rising movement which makes it possible to tolerate variations in the height of the bottles. Then the arms perform an oblique circular movement, with the link 7 rising slightly until the arms reach the position 8c, thus lifting the bottles 12 off the conveyor 1. Then the arms continue the same movement until they reach the position 8d, thus causing the movable link 7 to descend so that when the bottles are positioned on the conveyor 6, by opening the gripping mechanism, the vertical drop is reduced to a minimum. After the bottles have been released, the arms 8 return quickly to the position 8a so as to pick up the next row of bottles, which has in the meantime advanced on the conveyor a number of unit distances equal to the number of bottles picked up at one time.

To insure that the arms 8 move in a predetermined path, a cam 13, shown on FIG. 5, is driven by a motor 14 through variable speed gearing 15, a clutch 16, a drive chain 17 and a worm 18 which engages a gear wheel 19 fixed to the cam 13. Two rollers 20 ride on this cam, which has preferably a conjugate profile. These rollers actuate a sliding bar 23, provided with pins 24, acting through the pivotally mounted bent levers 21, which terminate in forks 22. The sliding bar is connected to move with two racks 25 and 26, each of which engages a gear (27 and 28 respectively) fixed to one of the two shafts 9 mounted obliquely in bearings 29 and 30. The arms 8 are mounted on these shafts.

Since the apparatus is positioned above the entrance to a lehr, the two racks 25 and 26 are connected to each other and to the sliding bar 23 by universal joints 31 which permit flexing in any direction in case the guides are distorted out of alignment by expansion of the metal therein. On the other hand, in order to allow for a possible difference in the expansion of the upper framework 32 comprising the racks, and the movable link 7, the gearing 28 driven by the rack 26 is keyed to the shaft 9, as indicated above, while the gearing 27 which engages the rack 25 drives only a member 33 provided with powerful springs 33a which act on members 34 fixed to the other shaft 9, so that the driving torque is transmitted to the corresponding arms 8 through springs 33. Any difference in between the expansion of one part of the mechanism and that of another is thus allowed for.

Pick-up mechanism 35 is mounted beneath the movable link 7. The height of this mechanism relative to the link 7 may be adjusted by means of a set screw 36 which acts simultaneously on two columns 37 fixed to the mechanism 35 and slidable in the link 7.

The pick-up mechanism 35 is shown partially in section on FIGURE 7. It will be seen that it comprises pairs of cheeks 41 connected by two bars 38 which carry at their ends the flexible metallic leaf springs 39 which grip the necks 40 of the bottles 12.

The cheeks 41 are each pivotally connected at two points 42 to the end of two cranks 43, the shafts 44 of which are fixed to a gear 45 inside the member 46. Three like members 46 are mounted directly below the member 35 and each encloses four gears 45 corresponding to two cheeks 41 and driven simultaneously by a double rack 47, the upper end of which is actuated by a lever 49. The three levers 49 corresponding to the three members 46 are fixed to a common shaft 50 extending longitudinally of the member 35 and actuated at one end by the compressed air cylinder 62 (FIG. 8) through a mechanical transmission which is adjustable to permit changes in the spacing between the gripping means 39.

It is easily seen that when the cylinder drives the shaft 50 in the direction indicated by the arrow 51, the four gears 45 turn in the direction indicated by the arrows 52, thus actuating the cheeks 38 through the cranks 43. These cheeks first separate from each other to release the neck 40, then rise so that the lower ends of the leaf springs 39 can pass over the necks 40. This makes it possible to return the pick-up mechanism toward its original position without knocking over the bottles already positioned. Conversely, when the air cylinder 62 drives the shaft 50 in the opposite direction, the cheeks 38 pick up the entire row of aligned bottles, all of which are resiliently gripped by the leaf springs 39, as has been seen, so that they may be lifted and moved. This air cylinder is naturally controlled by a distributor 53 actuated by a cam 54 fixed to the same shaft as the cam 13 which controls the operating cycle.

In order to permit the machine to operate in a rapid cadence while insuring perfect alignment of all the bottles on the conveyor 6 and damping their inertia, an alignment bar 55 is provided which is positioned as shown in FIG. 3 so as to come in contact with the sides of all the bottles in a row. It is always necessary to move this bar out of the way to permit the movable link 7 to return to its starting position. For this reason the bar is mounted by means of columns 56 adjustably mounted in a support 57 pivotally connected at two points 58 to the ends of two cranks 59 forming a parallellogram and pivotally connected at 60 and 61 to the bottle gripping mechanism. At the other end (the left in FIGS. 1 and 2), the corresponding support 57 is pivotally connected in like manner to two analagous cranks 59 and 59a, which pivot about points also designated 60 and 61.

The two pivot points 61 corresponding to the two ends of the mechanism 35 are connected by a single shaft rotating inside this mechanism and an air cylinder 62 which acts directly on the crank 59a and consequently acts indirectly through the shaft 61 on the crank 59 fixed to the other end of the same shaft. The assembly comprising the alignment bar 55 and the support 57 is thus moved vertically by the air cylinder until it can pass above the necks of the bottles while being slightly withdrawn. Naturally the bar descends again into its initial position when the arms 8 resume their position 8a (FIG. 4). The cylinder 62 is, as has already been seen, controlled by the air distributor 53 and the cam 54 (FIG. 1).

The speed control means 15 is so regulated that a complete cycle of operations takes place in a time slightly less than that required for the conveyor 1 to bring forward a predetermined number of bottles, and a counting device associated with the manufacturing machine releases the control for the clutch 16 to start each new cycle at the exact moment when the predetermined number of pulses has been produced. All the rows of bottles are perfectly aligned longitudinally of the lehr. If desired, the engagement of the clutch may be delayed by half the space between two bottles every other cycle, so that the bottles may be staggered transversely of the lehr.

On the other hand, the linear speed at which the conveyor 1 moves may be varied independently of the cycle of operations of the bottle distributor so that the bottles are spaced closer together or further apart on the conveyor 1. The spacing of these bottles longitudinally of the lehr may also be regulated by adjusting the speed of the conveyor 6 so that the bottles are very close to each other but nevertheless not in contact.

It is therefore clear that the apparatus described is very dependable in operation and may be supplied very rapidly without requiring manual attention. The machine is also relatively simple and reliable.

Finally, all the moving parts are instantly adjustable to permit its adaptation to the dimensions of the bottles.

It will be appreciated that this embodiment has been described purely by way of example and may be modified as to detail without thereby departing from the basic principles of the invention.

What is claimed is:

1. A machine for transferring a row of articles from a first position to a second position, said machine comprising elongated gripping means for simultaneously gripping all of the articles in said row, at least two arms pivotally attached to said gripping means at points spaced longitudinally therealong, individual pivot means for each arm on which said arms are mounted to swing between a position supporting said gripping means in its first position and one supporting said gripping means in its second position, said pivot means and arms constituting a parallellogram linkage for swinging said gripping means, and said pivot means being inclined away from a point intermediate said first and second gripping means positions, so that said gripping means is successively raised and lowered as it is swung between its two positions.

2. A machine as claimed in claim 1 for use in association with article delivering apparatus having means for counting the number of articles delivered, said machine comprising cam means controlling the swinging of said arms, means for driving said cam, and a clutch connecting said cam to said drive means, said clutch being adapted to be actuated by said counting means.

3. A machine as claimed in claim 1 in which said gripping means comprises two opposed parallel members, and parallellogram linkage for actuating said members, said parallellogram linkage being positioned to simultaneously raise and separate said members when swung in one direction and to simultaneously lower said members and bring them toward each other when swung in the other direction.

4. A machine as claimed in claim 3 comprising an article alignment rod carried by said gripping means and parallellogram linkage connecting said rod to said gripping means for swinging movement between a position adjacent one side of the row of articles to be gripped and a position upwardly of and away from said articles.

5. A machine as claimed in claim 4 comprising a fluid pressure system for actuating said gripping means and the parallellogram linkage for said alignment rod in proper sequence.

6. A machine as claimed in claim 1 comprising universal joints through which said arms are driven by said cams and resilient means through which one of said arms is driven from one of said universal joints.

References Cited

UNITED STATES PATENTS 1,974,837  9/1934  Shillinger _____ 214—1

FOREIGN PATENTS 955,715  4/1964  Great Britain.

GERALD M. FORLENZA, *Primary Examiner.*

G. F. ABRAHAM, *Assistant Examiner.*